Oct. 28, 1969  G. E. SMITH  3,475,036
TRAVEL LIMITING SERVICE FOR SHOPPING CART
Filed Oct. 6, 1967

Gilbert E. Smith
INVENTOR.

3,475,036
TRAVEL LIMITING SERVICE FOR SHOPPING CART
Gilbert E. Smith, 204th St., Box 336, Green Haven, Pasadena, Md. 21122
Filed Oct. 6, 1967, Ser. No. 673,481
Int. Cl. B62b 11/00; B60r 25/00
U.S. Cl. 280—33.99                                    5 Claims

ABSTRACT OF THE DISCLOSURE

A wheeled self-service store shopping cart and forward travel limiting means for the cart operatively mounted on the usual horizontal wheel-supported U-frame. The over-all concept comprehends forward travel limiting and stop means which is susceptible of production as a self-contained attachment which lends itself to use on shopping carts which are currently being used.

---

This invention relates to certain new and useful improvements in a theft-proof self-service store shopping cart construction wherein the cart, as such, may be and preferably is of a conventional type and wherein the essence of the over-all concept has to do with forward movement checking and limiting means which is capable of being embodied in or, alternatively, attached to the customary horizontal U-frame between the front swivelly mounted casters and rear wheels and which means is capable of limiting the forward distance of travel from an indoors locale at the bagging and basket loading end of the check-out counter to the usual out-of-doors package pick-up area.

Persons conversant with the art to which the invention relates are aware that it is old to utilize mechanical means which is so constructed and built into the cart that it can be employed normally within the confines of a business establishment such as a self-service store but which is such that it restricts the range of wheeled movement of the cart. Shopping carts in this field of endeavor are sometimes referred to in the art as theft-proof are designed and adapted to limit travel and confine movement of the cart within a predetermined or authorized area. It has been repeatedly recognized and is reiterated here that self-service stores are constantly faced with the perplexing problem of minimizing unauthorized removal of shopping carts from the store area. The axle lock disclosed in a patent to La Brie, Jr., 3,002,370 is exemplary of the general state of the art to which the present invention relates. The fact that prior art devices for limiting and restricting the permissible maneuverability of four-wheeled shopping carts have not met with widespread adoption and use has accounted, in part, for the herein disclosed endeavor and with a view toward advancing the art. To the ends desired the present invention has to do with a simple, practical and expedient device which can be built into the U-frame at the bottom of the cart and which, alternatively, may take the form of a ready-to-use attachment, that is, an adaptation which can be installed without altering the construction of the aforementioned U-frame.

Briefly, the invention comprises a wheeled frame structure embodying a horizontal U-frame provided at rearward corners with opposed companion wheels and at forward corners with opposed swivelly mounted casters complemental to said rearward wheels, handle-equipped vertical frame members attached to and rising perpendicularly from a rearward portion of said U-frame and provided with a horizontally disposed nesting-type basket located above and overhanging said U-frame, and forward movement limiting means operatively mounted on said U-frame rearwardly of said casters and forwardly of said rearward wheels and capable of limiting and restricting the forward wheeling and distance-of-travel of said cart from (1) the bagging and basket loading end of an indoors check-out counter to (2) out-of-doors attendant supervised vehicle drive-in and pick-up area.

Construed as a prefabricated and ready-to-use attachment for the aforementioned U-frame the invention comprises a rod which is adapted for horizontal disposition and which is of a length that it is capable of bridging or spanning the space between the usual opposed coplanar arms of the frame and wherein it is provided at its respective ends with adapters which are capable of operative connection with the arms of the aforementioned frame. A surface engaging limit stop roller is operatively mounted on the rod or shaft. This roller, when set for travel and distance limiting use, is capable of rotation a given maximum number of revolutions. When it stops turning it functions to check the prescribed permissible forward rolling movement of the cart to achieve the aforementioned objectives.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
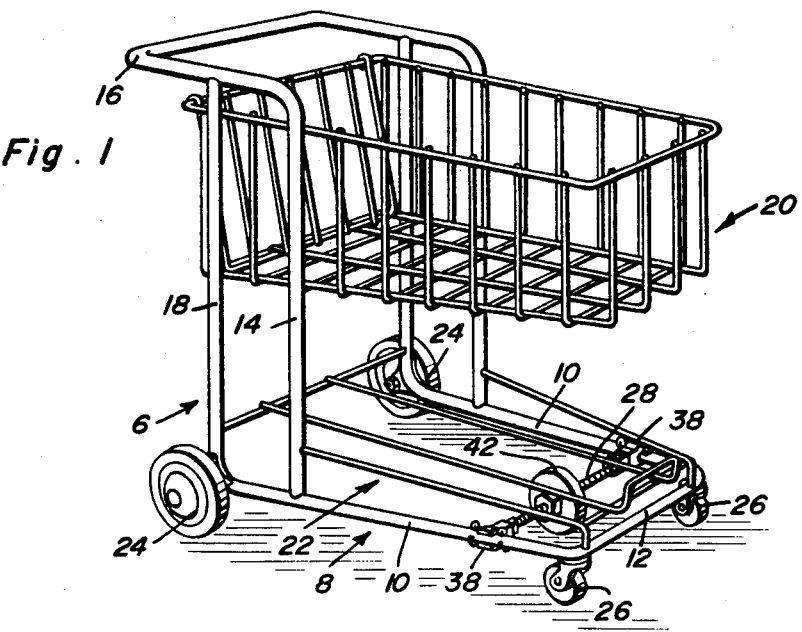
FIG. 1 is a view in perspective of a theft-proof shopping cart for self-service store use constructed in accordance with the principles of the invention.

It should be stated at the outset of the description of the details that the theft-proof shopping cart illustrated in FIG. 1 is not intended to be used within the shopping confines of the store. This is to say, it is contemplated that the cart will be a special purpose adaptation which is employed, preferably by a duly appointed attendant, between the bagging and loading end of the check-out counter and the area immediately outside of the establishment or store, more precisely, that area which is set aside for package pick-up purposes. To be sure, there may be instances wherein the customer would insist on wheeling her loaded cart by way of the exit door to the out-of-doors site. Accordingly, it is not so much the manner of use that is under consideration but rather the particular construction of the improved cart which renders it substantially theft-proof.

With reference to FIG. 1 the frame structure of the over-all shopping cart is denoted by the numeral 6. The horizontal U-frame is denoted at 8 and embodies, as usual, forwardly converging side arms 10 connected at their leading ends by a bight portion 12. The vertical components of the frame structure are denoted at 14 and are jointed with a push-pull handle 16 and are provided with rigidifying braces 18. The usual wire or openwork nesting grocery basket is denoted by numeral 20 and is supported above and in fact overlies the U-frame 8. The numeral 22 designates a bottom rack. The rear or rearward wheels are denoted at 24 and forward swivelly mounted steering wheels are denoted at 26. It will be evident therefore that the shopping cart thus far described is comparable with any ordinary or conventional type of cart.

Figure 2:
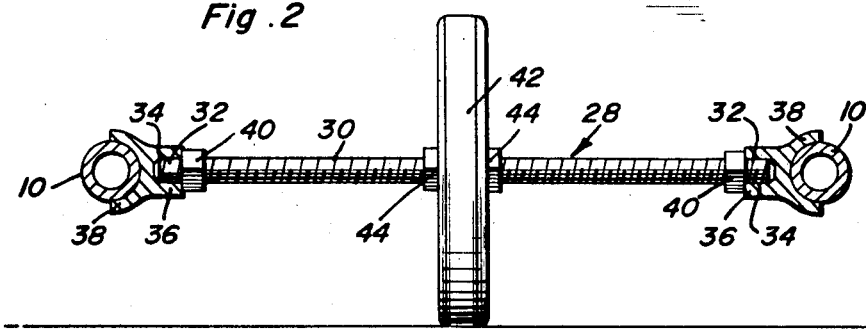
FIG. 2 is an enlarged transverse section taken through the lower part of the frame structure, more particularly the U-frame, and which shows in detail the forward movement limiting means, more particularly, the aforementioned attachment.
Figure 3:
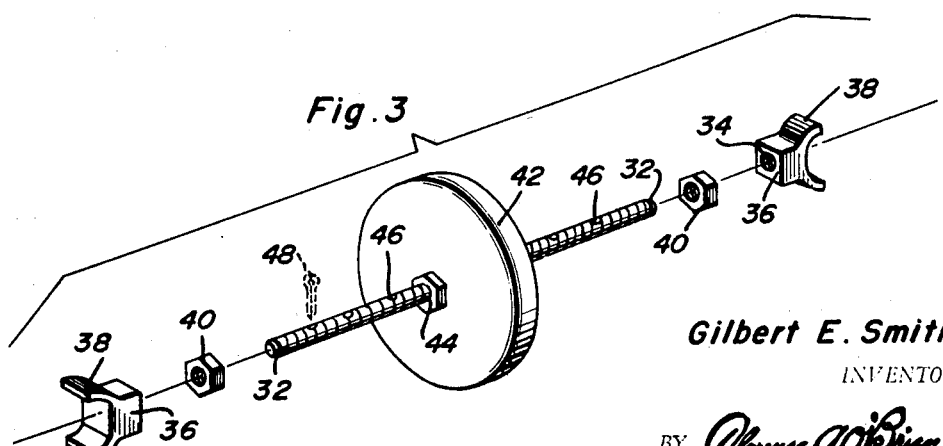
FIG. 3 is an exploded perspective view of the attachment by itself.

The improvement has to do with the forward movement limiting means which is operatively mounted on the U-shaped frame and which is located rearwardly of the front casters and forwardly of the rear wheels. This means is capable of limiting and restricting the forward wheeling and distance-of-travel of the cart over the aforementioned route, that is from the bagging and basket loading end of the check-out counter to the out-of-doors pickup carrier or site. It is reiterated that this means can be a permanent part of the U-frame or an attachment as shown. Considering the device as an attachment it will be seen that it comprises an appropriately elongated rod 28 which is threaded from end-to-end and wherein the threads 30 are measurably and incrementally gauged, that is relative to each other and also relative to the distance that the cart can or should be wheeled forwardly from the indoor to the outdoor site. The fact that the rod is threaded permits it to be properly referred to as a screwthreaded shaft. The terminal end portions 32 are screwed into screwthreaded sockets 34 provided therefor in the neck portions 36 of the channel-like adapter clamps 38. Each clamp is conformably shaped to bear in end thrust relation against the coacting arm in the manner shown in FIG. 2. The desired assembling and clamping result is achieved with the addition of lock nuts as at 40. Of utmost in importance is the rubber or equivalent surface engaging and limit stop roller which is denoted, as an entity, by the numeral 42. The central or hub portion is of the construction shown and may include a passage with attached and threaded nuts 44 at the ends, said nuts attached axially to opposite side surfaces of the roller. This screwthreaded hub can be made in the form of a bushing or however desired whereby to permit the roller to be threadedly mounted on the shaft and adjusted from left to right. In actual practice it is contemplated that the shaft shall be provided at longitudinally spaced points with selectively usable keeper holes 46 capable of receiving cotter-pins, one of which is shown in phantom lines at 48. In this manner it is possible to use the cotter-pin as a stop shoulder and to pre-select the limit travel step. This surface engaging anti-slipping limit stop roller is of significance in that when it is set for travel and dstance limiting use it is then capable of rotation which is restricted to a given maximum number of revolutions. When this desired result is attained the roller stops turning and then checks the set permissible forward rolling movement of the cart in a seemingly self-evident manner.

With the construction and described it is evident that the attendant or other person responsible for permissible and authorized use of the cart can regulate, vary, and set the forward travel distance in keeping with the established route, that is, from the indoor place of loading to the outdoor place of unloading and transfer to the customer's automobile. It will be evident also that with the construction shown the roller means once having been set or regulated does not have to be again regulated or re-set provided, of course, that the cart is properly and progressively rolled in a rearward or reverse direction over the same route, that is from outdoors to the aforementioned indoor bagging and basket-loading position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A theft-proof shopping cart for limitary use on the premises of a self-service store comprising, in combination, a wheeled frame structure embodying a horizontal U-frame provided at rearward corners with opposed companion wheels and the forward corners with opposed swivelly mounted casters complemental to said rearward wheels, handle-equipped vertical frame members attached to and rising perpendicularly from a rearward portion of said U-frame and provided with a horizontaly disposed nesting-type basket located above and overhanging said U-frame, a screw-threaded rotation-limit-control rod spanning the space between and supported on the arms of the U-frame, said rod constituting a roller mounting and adjusting shaft, and a ground engaging limit stop roller having an axial screw-threaded hub screwed for controllable operation on a median portion of said shaft, said roller being of a diameter that its peripheral surface is in constant contact with the surface which is being traversed, said roller being adapted to rotate and travel a predetermined distance to the left or right, respectively, of a given normal operating position whereupon it stops turning and then checks the permissibly set rolling movement of the cart either in a forward or a rearward direction at will, and means carried by said rod to the left and right of said roller position inwardly of the ends of said rods for left and right positions of said roller.

2. The theft-proof shopping cart defined in and according to claim 1 and wherein the respective outer ends of said rod are provided with mounting means for detachably and adjustably mounting the rod in the space between the arms of said U-frame.

3. For use on the wheel supported U-frame of a shopping cart, a self-contained readily applicable and removable attachment for said U-frame comprising, in combination, a rod adapted to assume a horizontal position in the space between the usual coplanar arms of said U-frame, said rod being externally screw-threaded and providing a rotation-limit-control shaft, said rod being of a length to completely bridge the space between said arms, end thrust adapter clamps operatively mounted on the respective outer ends of said rod and designed and adapted to be operatively connected with their respectively cooperable arms in a manner to detachably and adjustably suspend the rod in a functioning position between said arms, lock nuts screwed on coacting end portions of said rod and cooperatively abutting and retaining said clamps in their intended rod supporting and retaining position, and a surface engaging anti-slipping limit stop roller, said roller having a screw-threaded hub portion threaded on a median portion of said rod and adapted to rotate and trave to the left and right of a given operating position on said rod, said roller being of a diameter that the peripheral rim thereof is adapted to have constant rolling contact with the surface which is being traversed.

4. The attachment defined and according to claim 3 and wherein the threads on said rod are measurably and incrementally gauged relative to each other and the distance that the cart can be wheeled forwardly from the indoors bagging and loading site to the outdoor loading and bag transfer site, said rod having keeper holes bored therethrough to the left and right of the center point of the rod and located at predetermined longitudinally spaced points, said keeper holes being adapted to receive and retain selectively applicable and removable cotter pins, said cotter pins providing stop shoulders which are capable of checking the travel of said roller at whatever place desired on said rod.

5. For use on the wheel supported U-frame of a shopping cart, a self-contained readily applicable and removable attachment for said U-frame comprising, in combination, a rod adapted to assume the horizontal position in an existing space between the usual coplanar arms of said U-frame, said rod being externally screw-threaded and providing a shaft, end thrust adapter clamps operatively mounted on the respective outer ends of said rod and designed and adapted to be operatively connected with their respectively cooperable arms in a manner to suspend the rod in a given functioning position between said arms, a surface engaging limit stop roller having a screw-threaded hub portion threaded on a median portion of said rod and adapted to travel to the left and right, respectively, of a normally centered operating position on said rod, said roller being of a prescribed diameter that the peripheral rim thereon is adapted to have constant rolling contact with the surface which is being traversed, and manually applicable and removable limit stops operatively mounted on said rod to the left and right of said centered roller and adapted to limit the travel of said roller to the left on the one hand and to the right on the other hand, depending on whether the cart is being pushed forwardly out of the store for unloading, or is being intentionally rolled rearwardly in a reverse manner and thus returned to the interior of the store for subsequent use by the next customer.

References Cited

UNITED STATES PATENTS

| | | |
|---|---|---|
| 1,405,417 | 2/1922 | Jansson. |
| 3,002,370 | 10/1961 | La Brie. |
| 3,090,470 | 5/1963 | Abrams. |
| 3,394,945 | 7/1968 | Steier et al. |

LEO FRIAGLIA, Primary Examiner

MILTON L. SMITH, Assistant Examiner

U.S. Cl. X.R.

188—21, 71, 110; 192—141